(12) United States Patent
Yannam et al.

(10) Patent No.: US 12,425,359 B2
(45) Date of Patent: Sep. 23, 2025

(54) INTEGRATION OF AI-POWERED CONVERSATIONAL MESSAGING WITH A LIVE AGENT INTERACTION

(71) Applicant: Bank of America Corporation, Charlotte, NC (US)

(72) Inventors: Ramakrishna R. Yannam, The Colony, TX (US); Priyank R. Shah, Plano, TX (US); Emad Noorizadeh, Plano, TX (US); Rajan Jhaveri, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 536 days.

(21) Appl. No.: 17/750,471

(22) Filed: May 23, 2022

(65) Prior Publication Data
US 2023/0379273 A1 Nov. 23, 2023

(51) Int. Cl.
| | | |
|---|---|---|
| *H04L 51/02* | (2022.01) | |
| *H04L 51/063* | (2022.01) | |
| *H04L 51/216* | (2022.01) | |
| *H04L 51/58* | (2022.01) | |
| *H04M 1/72436* | (2021.01) | |
| *H04M 1/72445* | (2021.01) | |
| *G06F 3/0482* | (2013.01) | |

(52) U.S. Cl.
CPC ............ *H04L 51/02* (2013.01); *H04L 51/063* (2013.01); *H04L 51/216* (2022.05); *H04L 51/58* (2022.05); *H04M 1/72436* (2021.01); *H04M 1/72445* (2021.01); *G06F 3/0482* (2013.01); *H04M 2201/42* (2013.01)

(58) Field of Classification Search
CPC ....... H04L 51/02; H04L 51/58; H04L 51/063; H04L 51/216; H04M 1/72436; H04M 2201/42; G06F 3/0482
See application file for complete search history.

(56) References Cited

U.S. PATENT DOCUMENTS

| | | | |
|---|---|---|---|
| 10,999,434 B1 * | 5/2021 | Andar | G06N 5/04 |
| 2016/0041849 A1 * | 2/2016 | Naveh | G06Q 10/103 |
| | | | 718/104 |
| 2019/0311036 A1 * | 10/2019 | Shanmugam | G06F 40/56 |
| 2021/0144106 A1 * | 5/2021 | Chen | G06F 40/35 |
| 2022/0269983 A1 * | 8/2022 | Zhang | G06N 20/00 |
| 2023/0353516 A1 * | 11/2023 | Banerjee | G06Q 20/108 |

FOREIGN PATENT DOCUMENTS

WO    WO 2018036153 A1 *   3/2018

* cited by examiner

*Primary Examiner* — Muthuswamy G Manoharan
(74) *Attorney, Agent, or Firm* — Weiss & Arons LLP

(57) ABSTRACT

Systems, methods, and apparatus are provided for integrating AI-powered bot-generated responses with an agent interface during a live session with a customer. In response to a customer request, a live chat session may be initiated with an agent at first platform that includes an agent interface. A parallel session may be initiated at a second platform that includes an interactive response system and AI engine. An input from a customer may be displayed at the first platform and may also be received at the second platform. The second platform may derive intent from the input and generate an AI-based response. The response may be displayed in a window at the first platform. The agent may approve, reject, or modify the generated response. Following agent approval, the response may be inserted into the live customer session.

21 Claims, 6 Drawing Sheets

FIG. 4

| Row # | category | text |
|---|---|---|
| 1 | customerQ | What is Eidl? |
| 2 | ag_response | Hello! My name is Adam and I will be happy to answer questions you may have |
| 3 | ag_response | Thank you for being a valued client with us |
| 4 | customerQ | How do we figure that out to estimate the loan |
| 5 | customerQ | Thank you so much |
| 6 | ag_response | EIDL is not a bank product, you may visit the SBA website for more information |
| 7 | ag_response | If you have not received funds from the EIDL then you would not need to add that amount in |
| 8 | customerQ | Oh okay so we do not have to add it in at the moment only the payroll for the month X 2.5 |
| 9 | ag_response | Exactly |
| 10 | ag_response | Okay, great thank you for all your help! |
| 11 | customerQ | You're welcome, I hope you have a great evening, I am glad that I was able to assist you today; After this chat session is closed, you will receive a survey to rate your experience with me; I would greatly appreciate your feedback! |
| 12 | ag_response | |
| 13 | customerQ | left due to disconnect |

Live Chat customerQ: What is Eidl?

Erica will be with you soon.

Erica: EIDL is not a bank product, you may visit the SBA website for more information ag_response: EIDL is not a bank product, you may visit the SBA website for more information Type reply

| | Workspace | |
|---|---|---|
| | customer ⏺ 05:18 | |
| 1 | customerQ | hi |
| 2 | gen_response | Your chat may be recorded and monitored for quality purposes. Please share how we may assist you and an agent will join to help shortly |
| 3 | ag_response | Hello! My name is Luis and I will be happy to answer questions you may have |
| 4 | customerQ | I got email for updating my sba loan application |
| 5 | customerQ | What you need to do |
| 6 | ag_response | To clarify did the prompt not appear? |
| 7 | customerQ | It did not appear |
| 8 | ag_response | I would recommend checking back at a later time. We have escalated this issue as there may be a slight delay in the prompt |
| 9 | customerQ | ok |
| 10 | customerQ | would you be able to check status on my application? |
| 11 | ag_response | We are working as quickly as we can to try to get this resolved. We do appreciate your patience during this time. |
| 12 | ag_response | I do apologize we would not be able to check the status of your application. |
| 13 | customerQ | ok will try again later today |
| 14 | ag_response | Perfect. |
| 15 | ag_response | I am glad that I was able to assist you today! After this chat session is closed, you will receive a survey to rate your experience with me; I would greatly appreciate your feedback! |
| 16 | ag_response | left with request to close forced |
| 17 | customerQ | left due to disconnect |

602

Workspace

---

Live Chat customerQ: would you be able to check status on my application?

Erica will be with you soon.

Erica: However there is not one specific individual or department that will be able to address this, as the application is 100% digital

✓  ✗  ✏️

Agent rejected auto-suggested answer.

Type reply

INTEGRATION OF AI-POWERED CONVERSATIONAL MESSAGING WITH A LIVE AGENT INTERACTION

FIELD OF TECHNOLOGY

Aspects of the disclosure relate to mobile applications for use with mobile devices.

BACKGROUND OF THE DISCLOSURE

An enterprise customer may communicate with the enterprise through a variety of channels. For example, a customer may communicate by telephone, internet-based chat, or chat through a mobile application. In each of these mediums, the customer may engage with either an interactive response system or a with live agent.

In the course of communications with an interactive response system, a bot such as a chatbot may provide prompts for the customer. Chatbots are software used to automate conversations and interact with humans through various communication platforms. Chatbots may be powered by pre-programmed responses, artificial intelligence (AI) and/or machine learning in order to answer questions without involving a human agent. Chatbots may simulate conversations with a human using text, text-to-speech, or speech-to-speech.

Interactions with a live agent may not provide the same level of consistency and comprehensiveness that a customer obtains through bot interactions. Conventionally, an agent is provided with a standardized menu of options and must work their way through a prescribed set of questions and responses.

It would be desirable for an agent to be aided by bot-generated responses and prompts. It would be desirable to continually improve the chatbot aid provided to agents by training an AI-powered bot using crowdsourced responses from successful agents.

SUMMARY OF THE DISCLOSURE

Systems, methods, and apparatus are provided for integrating AI-powered conversational messaging with an agent interface during a live customer session.

A customer may request a live session at a mobile device using a mobile application or via any suitable method. A live session may be initiated at an agent interface. A parallel session may be initiated at an interactive response system. The interactive response system may include one or more neural networks.

A customer input may be entered at the mobile device. The input may be displayed at the agent interface. The input may also be received at the interactive response system.

The interactive response system may generate an AI-based response to the customer input. The response may be displayed at the agent interface. Following agent approval, the response may be transmitted to the customer mobile device.

The agent interface may receive a task closure entry. In response to the task closure entry, the interactive response system may transmit a reminder to the agent interface. In response to the task closure entry, the agent interface may transmit a session history to the interactive response system. The interactive response system may mine the session history to generate a training set for the neural network. The interactive response system may also mine crowdsourced session histories from highly rated agents to generate training sets for the neural network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows a set of illustrative screen views in accordance with principles of the disclosure;

FIG. 6 shows a set of illustrative screen views in accordance with principles of the disclosure.

DETAILED DESCRIPTION

Figure 1:
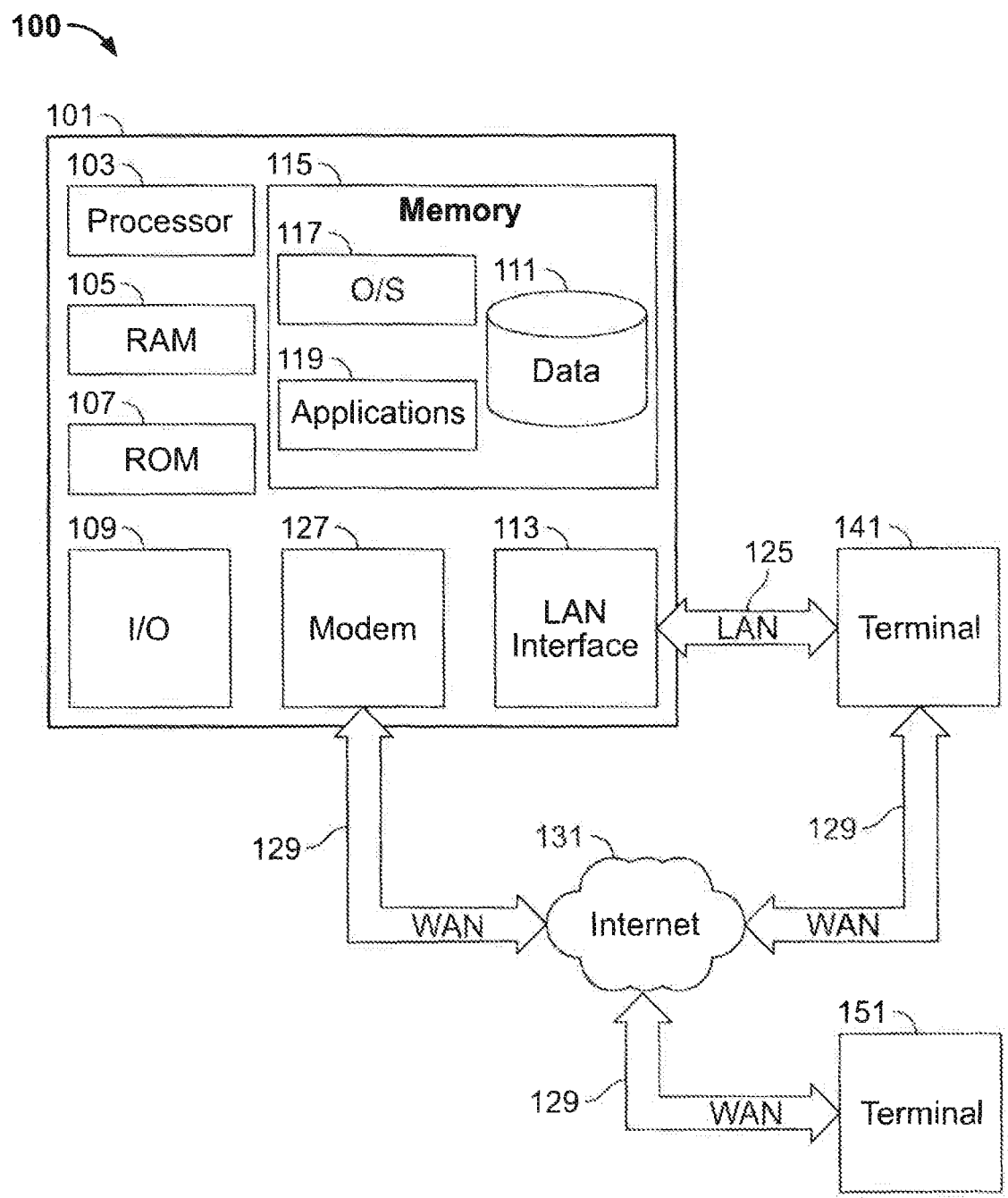
FIG. 1 shows illustrative apparatus in accordance with principles of the disclosure.

Systems, methods, and apparatus are provided for integrating AI-powered conversational messaging with an agent interface during a live customer session.

For the sake of illustration, the invention will be described as being performed by a "system." The system may include one or more features of apparatus and methods that are described herein and/or any other suitable device or approach.

The system may include a first communication interface. The first interface may be an agent interface for an agent to interact with a customer. The agent interface may display a customer input. The agent interface may receive an agent input. The agent interface may display a customer input along with an agent response. The agent interface may be a customer response manager (CRM). A CRM display may show the agent a menu of predetermined responses for the agent. Illustrative agent interfaces include Genesys mobile services, produced by Genesys Telecommunications Laboratory, Inc.

The first communication interface may receive input from a customer at a mobile device application or via any suitable method. The mobile device application may include a live chat function for interacting with an agent in real time.

In some embodiments, communication with a chatbot and communication with a live agent may be implemented within a single mobile application chat function. Communication with both the chatbot and the live agent may occur within a single chat session. For example, a customer may begin interactions with the chatbot. In the course of communication with the chatbot, the customer may request a live agent. The same chat function may then present communication with a live agent.

The first communication interface may be initiated in response to a customer request for communication with an agent. The request may be received through a mobile application.

The system may include a second communication interface for an interactive response system. The interactive response system may include a chatbot.

The second communication interface may also be initiated in response to the customer request for communication with the agent. Customer inputs to the live chat may also be received by the interactive response system.

An interactive response system bot may perform intent detection on a customer input. The bot may use natural language understanding to determine intent and extract entities from the customer input. For example, if a customer enters "I need help with a dispute," the system may determine intent as "need assistance" and a topic/entity as "filing a dispute." Intent may be determined using one or more machine learning algorithms such as an unsupervised clustering algorithm or any suitable classification algorithm.

In response to a determination of intent and topic, the bot may retrieve answers associated with the topic from a knowledge store. The bot may use a neural network to make next step predictions based on legacy intelligence and actions by customers. In some embodiments, the bot-generated responses may be personalized for an individual customer based on individual past actions.

The interactive response system may incorporate AI-based responses. The system may train an AI-powered communication engine. The system may designate a topic of user interest and retrieve legacy communications regarding the topic. The legacy communications are preferably retrieved from an electronically stored library of communications. In some embodiments, the library of communications may relate to one or more pre-determined users in order to develop a customized AI model for an individual user.

The system may preferably remove duplicative communications from retrieved list of legacy communications. For the purposes of this application, duplicative communications may include any communications that do not introduce any non-cumulative information beyond information already derived from other communications sources.

The system may retrieve legacy intelligence relating to historical user selections regarding the topic. These user selections may include selections made in response to electronic prompting of the user.

The system may retrieve a plurality of outcomes based on the legacy intelligence. The plurality of outcomes may include outcomes associated with historical user selections. The user selections may include the topic of user interest. These outcomes may preferably be tailored to show direct, substantially direct, or indirect results that flowed from the historical user selections.

The system may form a training set for a neural network. In some embodiments, the training set may specifically relate to a topic of user interest. Forming a topic-centric training set for a neural network may include mining information that relates to legacy user communications, legacy intelligence, and the plurality of outcomes as described above. This information can then inform the set of nodes that form the neural network.

The topic-centric training set may, in certain embodiments be delimited by an analysis of a relevant database. The database may include legacy user communications, legacy intelligence, and the plurality of outcomes as described above. An analysis may be performed to obtain, for example, the 100 most common nouns in the database. For these databases, the topic-centric training set may mine all communications and other information related these terms. The method may use the topic-centric training set to form a neural network for each of the 100 most common nouns in the database. In certain embodiments, the topics of interest in the database may be reduced to a suitable pre-determined number of most-occurring topics of interest.

Because the mined information has been derived in a way that is customized to the user, each of the topic-based neural networks may include information that is ranked according to individual usage patterns.

The formation of each neural network may use the topic-centric training set to assign individual weights to each of the plurality of nodes based on the legacy communications, legacy intelligence, and the plurality of outcomes.

In response to a selection by a user of a topic of user interest, the system may generate a plurality of topic-related user options based on the neural network. These options may preferably have been formed with an associated priority score. The system may use the priority to score to rank and display the plurality of user options.

Conventionally, customer interactions with a live agent may be entirely segregated from interactions with the interactive response system. Integrating bot-generated prompts and actions with an agent interface may provide the agent with a more comprehensive set of responses to customer requests.

The bot-generated responses may be displayed in a pop-up on the agent interface. The pop up may include multiple selectable options associated with each response. Selectable options may include the option to approve the response. Selectable options may include the option to reject the response. Selectable options may include the option to modify the response. In response to agent approval, the system may insert the response into the live chat with the customer as an agent response.

The bot-generated responses may include next-step predictions. For example, the bot may identify documents and forms that may be helpful to the agent. An agent may select an option to view the document. An agent may select an option to transmit the document to the customer. In some embodiments, agent approval of a document or form may automatically insert a link for access to the document into the chat with the customer.

In some embodiments, the bot may prepare selectable scenarios for the customer such as payment option or transfer option. Receiving agent approval may insert a selectable payment option or transfer option into the live chat with the customer.

The bot-generated responses may include silent injection. In some scenarios, the bot responses may be inserted directly into the chat with the customer without agent involvement.

The bot may continue to assist the agent after the live chat is complete. During the task closure process, the bot may generate suggestions and reminders for follow up or further research by the agent. During the task closure process, the session history from the first interface may be mined as feedback for ongoing training of the interactive response system AI engine.

In some cases, the system may not be able to determine intent from the customer input. A bot may crowdsource the customer input to a group of agents. Crowdsourcing may involve determining a set of agents with high customer approval ratings.

Crowdsourcing may involve identifying customer inputs along with corresponding bot-generated responses that were modified by the agents or responses generated entirely by the agents. Responses from different sessions may be mined and the data may be used to train the AI engine.

In some embodiments, crowdsourcing may involve a group of trained agents reviewing determinations of intent made using machine learning. The agents also may review intents and the associated bot-generated responses for a fixed time period. Agent feedback may be used to train and tune the AI engine. In this way, intelligence from successful agents may be folded into the bot for a better customer experience across the board.

A method for integrating an agent interface with AI-powered conversational messaging integrating an agent interface with AI-powered conversational messaging during a live agent-customer session is provided.

The method may include, in response to a customer request, initiating a live session with an agent at a first platform that includes an agent interface. A parallel session may be initiated at a second platform that includes an interactive response system and an AI engine.

An input from a customer may be displayed at the first platform and may also be received at the second platform. The second platform may derive intent from the input and generate an AI-based response. The response may be displayed in a pop up at the first platform. The agent may approve, reject, or modify the generated response. Following agent approval, the response may be inserted into the live customer session.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
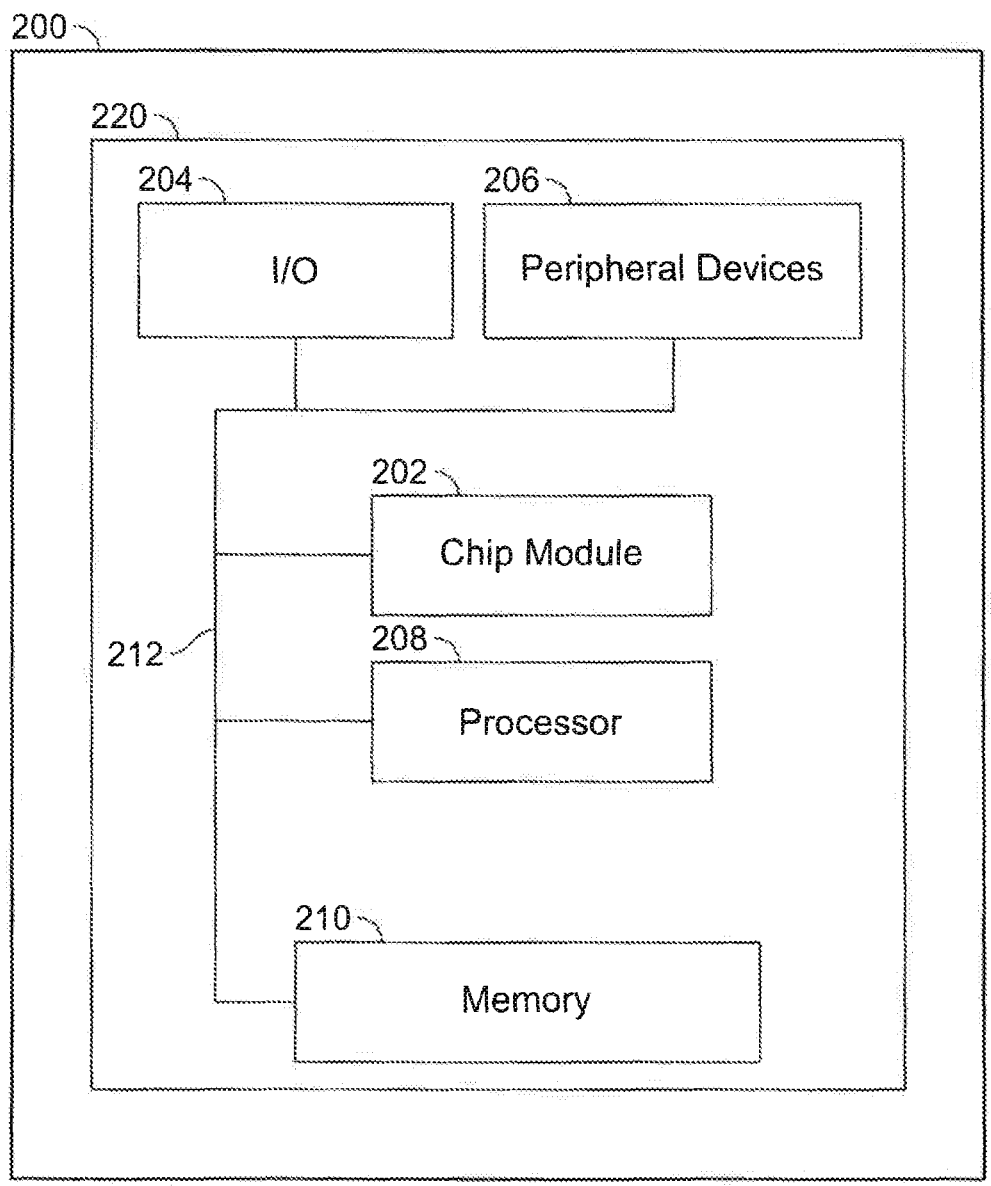
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
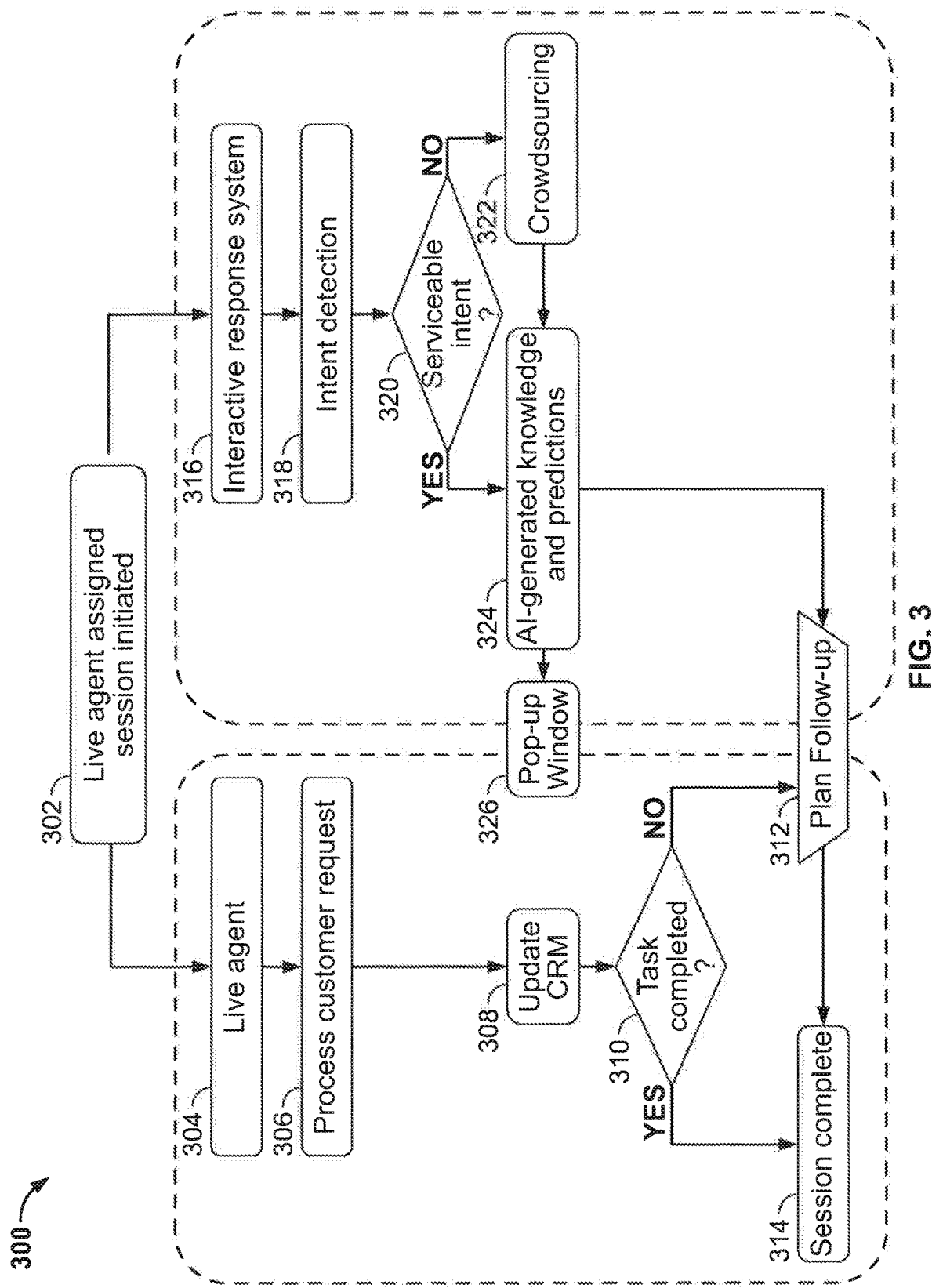
FIG. 3 shows an illustrative process flow in accordance with principles of the disclosure.

FIG. 3 shows an illustrative process flow 300 in accordance with the principles of the disclosure. Process flow 300 shows integrating bot-generated responses with a live agent-customer interaction.

A customer may request a live chat at a mobile device application on a mobile device or via any suitable medium. At 302, a live agent is assigned and a session is initiated.

Steps 304-314 show an activity at an agent interface. At 304, the agent may receive a customer input. At 306, the agent may process the customer input. At 308, the agent may interact with the customer using a customer response management (CRM) interface. The agent may be assisted in these interactions by a parallel AI-based process as set forth below. At 310, a determination may be made as to whether the task is complete. At 312, any agent follow-up tasks may be planned. Illustrative follow-up tasks may involve researching a question that arose in the chat, locating documents, checking status, and/or providing additional information to the customer. At 314, the session may be complete.

Steps 316-326 show parallel activity at an interactive response system. The interactive response system may rely on one or more bots. The interactive response system may include an AI engine for intent detection, knowledge base access, and next step predictions. The AI engine may include one or more machine learning algorithms. Illustrative machine learning algorithms include clustering algorithms, random forest algorithms, logistic regression algorithms, support vector machine algorithms and decision tree algorithms.

At 316, the interactive response system may receive the customer input. At 318, the system may use AI to determine customer intent. At 320, the system may evaluate the determination of intent. At 324, based on the intent, the AI engine may create predictions and access stored knowledge to generate a response. At 326, a pop-up window may display a generated response at the agent interface. The pop-up window may include selectable options for the agent to accept, reject, or modify the response. An accepted or modified response may be inserted into the ongoing live agent-customer interaction.

In response to task closure at 312, the interactive response system may generate reminders or suggestions for display to the agent.

At 322, crowdsourcing may be used to train the AI engine. Crowdsourcing may involve identifying one or more successful agents. Crowdsourcing may involve mining responses from the agents to generate a training set for the AI engine.

FIG. 4 shows illustrative screenshots in accordance with the principles of the invention. At 402, an agent interface shows interactions during a live session with a customer. At 404, a pop-up window within the agent interface shows responses generated by an interactive response system (Erica). Window 404 includes options for accepting, rejecting, or modifying the generated response. In window 404, the agent has accepted the response. The customer input is shown at 406. The generated response has been inserted into the interaction at 408.

Figure 5:
FIG. 5 shows a set of illustrative screen views in accordance with principles of the disclosure.

FIG. 5 shows illustrative screenshots in accordance with the principles of the invention. At 502, an agent interface shows interactions from a live session with a customer. At 504, a pop-up window on the agent interface shows responses generated by an interactive response system (Erica). Window 504 includes options for accepting, rejecting, or modifying the generated response. In window 504, the agent has accepted the response. The customer input is shown in the agent interface at 506. The generated response has been inserted into the interaction at 508.

FIG. 6 shows illustrative screenshots in accordance with the principles of the invention. At 602, an agent interface shows interactions from a live session with a customer. At 604, a pop-up window on the agent interface shows responses generated by an interactive response system (Erica). Window 604 includes options for accepting, rejecting, or modifying the generated response. In window 604, the agent has rejected the response. The customer input is shown in agent interface at 606. The generated response has not been inserted.

Thus, methods and apparatus for INTEGRATION OF AI-POWERED CONVERSATIONAL MESSAGING WITH A LIVE AGENT INTERACTION are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for integrating an agent interface with AI-powered conversational messaging, the method comprising:
   initiating a session at an agent device associated with a first platform, the session comprising two-way communication between a customer mobile device and the agent device;
   initiating a parallel session at an interactive response system comprising a neural network and associated with a second platform, the parallel session comprising one-way communication from the customer mobile device to the interactive response system;
   receiving an input from the customer mobile device at the agent device and at the interactive response system;
   generating an AI-based response at the interactive response system;
   displaying the response at the agent device for agent approval; and
   in response to receiving agent approval, displaying the response at the customer mobile device.

2. The media of claim 1, further comprising, at the interactive response system:
   generating a prediction based on the customer input; and
   based on the prediction, displaying a link to a document at the agent device.

3. The media of claim 1, further comprising displaying the generated response on the customer mobile device without agent approval.

4. The media of claim 1, further comprising determining an intent associated with the customer input at the interactive response system using natural language understanding.

5. The media of claim 4, further comprising, in response to a failure to determine intent:
   identifying a set of agents having a threshold approval rating;
   identifying a first set of responses comprising AI-based responses generated at the interactive response system and modified by the set of agents;
   identifying a second set of responses comprising AI-based responses generated at the interactive response system and rejected by the set of agents; and
   mining session histories associated with the set of agents, the session histories comprising the first set of responses and the second set of responses to generate a training set for the neural network.

6. The media of claim 1, further comprising receiving a task closure for the session at the agent device and, in response to the task closure:
   generating a reminder message at the interactive response system, the reminder message generated based on the content of the session and comprising a post-session task for the agent related to the content of the session;
   displaying the reminder at the agent device; and
   transmitting a session history from the agent device to the interactive response system to train the neural network.

7. The media of claim 1 further comprising, at the interactive response system:
   designating a topic of customer interest;
   retrieving legacy communications regarding the topic;
   determining whether duplicative communications are included among the legacy communications and, to the extent that duplicative communications are included in the legacy communications, removing the duplicative communications from the legacy communications;
   retrieving legacy intelligence relating to historical customer selections regarding the topic;
   retrieving a plurality of outcomes based on the legacy intelligence;
   forming a training set for a neural network associated with the topic, the training set based on the legacy communications, legacy intelligence, and the plurality of outcomes and delimited based on an analysis of the database;
   synthesizing the neural network, the neural network comprising a plurality of nodes, the synthesizing comprising using the training set to assign individual weights to each of the plurality of nodes; and
   in response to a determination of intent, using the neural network to generate an AI-based response related to the topic.

8. The media of claim 7, further comprising generating a priority score for each of a plurality of AI-generated responses to a customer input.

9. The media of claim 7, wherein the response comprises results of legacy customer selections associated with the topic of customer interest.

10. The media of claim 7, wherein the analysis of the database comprises:
   identifying a pre-determined number of topics of interest, each topic associated with a training set; and reducing the topics of interest found in the database to a pre-determined number of most-occurring topics of interest.

11. A system for integrating a live customer service session with AI-powered conversational messaging, the system comprising:
a mobile device comprising a mobile application configured to receive a customer input;
an interactive response system configured to:
initiate a session comprising one-way communication from the mobile device;
receive the customer input from the mobile device; and
generate an AI-based response; and
an agent device configured to:
initiate a session comprising two-way communication between the mobile device and the agent device;
display the customer input;
display the generated response from the interactive response system; and
in response to receiving agent approval, transmit the generated response to the mobile device.

12. The system of claim 11, wherein the agent device is further configured to:
receive an agent modification of the generated response; and
in response to receiving the agent modification, transmit the generated response to the customer mobile device.

13. The system of claim 11, the interactive response system further configured to:
generate a prediction based on the customer input; and
based on the prediction, transmit a document to the agent device.

14. The system of claim 13, wherein agent approval of the predicted document transmits a link to the document to the mobile device.

15. The system of claim 11, further comprising displaying the generated response at the mobile device without agent approval.

16. The system of claim 11, wherein the interactive response system is configured to determine an intent associated with the customer input using natural language understanding.

17. The system of claim 16, wherein, in response to a failure to determine intent, the interactive response system is configured to:
identify a set of agents having a threshold approval rating; and
mine a session history associated with the set of agents to generate a training set for the neural network.

18. The system of claim 11, wherein:
the agent device is configured to receive a task closure; and
in response to the task closure, the interactive response system is configured to:
generate a reminder message for the agent;
transmit the reminder to the agent device; and
mine the session history from the agent device to generate a training set for the neural network.

19. A method for integrating an agent interface with AI-powered conversational messaging, the method comprising:
at a first platform comprising an agent interface:
initiating a live chat session with a customer;
receiving a customer input;
displaying an AI-based response generated at a second platform; and
in response to agent approval of the generated response, inserting the response into the live chat session; and
at the second platform comprising an interactive response system and AI engine:
receiving the customer input; and
generating an AI-based response at the interactive response system using a neural network.

20. The method of claim 19, further comprising displaying the generated response on the first platform in an interactive window.

21. The method of claim 20, further comprising displaying selectable options for accepting, rejecting, or modifying the generated response.

* * * * *